US012811669B2

(12) United States Patent
Wu et al.

(10) Patent No.: US 12,811,669 B2
(45) Date of Patent: Nov. 24, 2026

(54) METHODS AND APPARATUSES FOR A MEASUREMENT REPORT IN A NTN ENVIRONMENT

(71) Applicant: LENOVO (BEIJING) LIMITED, Beijing (CN)

(72) Inventors: Lianhai Wu, Beijing (CN); Mingzeng Dai, Shanghai (CN); Haiming Wang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 618 days.

(21) Appl. No.: 18/006,971

(22) PCT Filed: Jul. 28, 2020

(86) PCT No.: PCT/CN2020/105242
§ 371 (c)(1),
(2) Date: Jan. 26, 2023

(87) PCT Pub. No.: WO2022/021074
PCT Pub. Date: Feb. 3, 2022

(65) Prior Publication Data
US 2023/0275652 A1 Aug. 31, 2023

(51) Int. Cl.
*H04B 7/185* (2006.01)
*H04W 24/08* (2009.01)
(Continued)

(52) U.S. Cl.
CPC ........ *H04B 7/18519* (2013.01); *H04W 24/08* (2013.01); *H04W 24/10* (2013.01); *H04W 36/322* (2023.05)

(58) Field of Classification Search
CPC .. H04B 7/185; H04B 7/1851; H04B 7/18519; H04B 7/18523; H04B 7/18526;
(Continued)

(56) References Cited

U.S. PATENT DOCUMENTS

2019/0166516 A1 5/2019 Kim
2021/0227442 A1* 7/2021 Yiu ................. H04W 36/00837
(Continued)

FOREIGN PATENT DOCUMENTS

CN 102300246 A 12/2011
CN 108260139 A 7/2018
(Continued)

OTHER PUBLICATIONS

ETSI, "Radio Resource Control (RRC); Protocol specification (3GPP TS 38.331 version 15.9.0 Release 15)", (Apr. 2020), ETSI TS 138 331, V15.9.0, pp. 1-526 (Year: 2020).*
(Continued)

*Primary Examiner* — Paul H. Masur
(74) *Attorney, Agent, or Firm* — AMPACC Law Group, PLLC

(57) ABSTRACT

Embodiments of the present application relate to methods and apparatuses for a measurement report in a non terrestrial network (NTN) environment. According to an embodiment of the present application, a method can include: receiving a radio resource control (RRC) reconfiguration message, wherein the RRC reconfiguration message includes measurement configuration information; performing a measurement procedure based on the measurement configuration information; determining whether one or more reporting events are satisfied, wherein the one or more reporting events trigger to transmit a measurement report; and in response to satisfying a reporting event, transmitting the measurement report, wherein the reporting event is included in the measurement configuration information, and the reporting event can be a location based event or a combination of a measurement based event and a location based event.

17 Claims, 3 Drawing Sheets

(51) Int. Cl.
*H04W 24/10* (2009.01)
*H04W 36/32* (2009.01)

(58) Field of Classification Search
CPC ... H04W 36/24; H04W 36/32; H04W 36/322; H04W 36/08; H04W 36/083; H04W 36/0005; H04W 36/0055; H04W 36/0058; H04W 36/0083; H04W 36/0085; H04W 36/0094; H04W 24/08; H04W 84/06
See application file for complete search history.

(56) References Cited

U.S. PATENT DOCUMENTS

| | | | | |
|---|---|---|---|---|
| 2021/0314828 | A1* | 10/2021 | Kim | H04W 4/40 |
| 2021/0389458 | A1* | 12/2021 | Ohnaka | G01S 7/484 |
| 2022/0086713 | A1* | 3/2022 | Määttänen | H04W 36/00837 |
| 2022/0377625 | A1* | 11/2022 | Li | H04W 36/0058 |

FOREIGN PATENT DOCUMENTS

| | | | |
|---|---|---|---|
| CN | 108616907 | A | 10/2018 |
| CN | 110972179 | A | 4/2020 |
| CN | 111010708 | A | 4/2020 |
| WO | 2019061138 | A1 | 4/2019 |
| WO | 2020067826 | A1 | 4/2020 |
| WO | 2020092561 | A1 | 5/2020 |
| WO | 2022021080 | A1 | 2/2022 |

OTHER PUBLICATIONS

"3rd Generation Partnership Project; Technical Specification Group Radio Access Network; Solutions for NR to support non-terrestrial networks (NTN) (Release 16)" 3GPP Standard; Technical Report; 3GPP TR 38.821, vol. RAN WG3, No. V16.0.0; Jan. 16, 2020; pp. 1-140; URL:ftp://ftp.3gpp.org/Specs/archive/38_series/38.821/38821-g00.zip 38821-g00.doc.

"3rd Generation Partnership Project; Technical Specification Group Radio Access Network; NR; Radio Resource Control (RRC) protocol specification (Release 16)", 3GPP Standard; Technical Specification; 3GPP Ts 38.331, vol. RAN WG2, No. V16.1.0; Jul. 24, 2020; pp. 1-906; URL:ftp://ftp.3gpp.org/Specs/archive/38_series/38.331/38331-gl0.zip 38331-gl0.docx.

NEC: "Location based mobility enhancement" , 3GPP TSG-RAN WG2 Meeting #107bis R2-1912977; Oct. 18, 2019; 4 pages.

Ericsson: "Location reporting for NTN", 3GPP TSG-RAN WG2 #107 R2-1911272; Aug. 30, 2019; 9 pages.

LG Electronics Inc. "Remaining issues on handover enhancements", 3GPP TSG-RAN WG2 Meeting #124 R2-2313399; Nov. 17, 2023; 14 pages.

European Search Report and Written Opinion dated Mar. 13, 2024 for European patent application No. 20947079.8.

International Search Report and Written Opinion dated Apr. 16, 2021 for International Application No. PCT /CN2020/105242.

* cited by examiner

METHODS AND APPARATUSES FOR A MEASUREMENT REPORT IN A NTN ENVIRONMENT

CROSS-REFERENCE TO RELATED APPLICATIONS

The present application is a U.S. National Stage of International Patent Application No. PCT/CN2020/105242 filed Jul. 28, 2020, the entire content of which is incorporated herein by reference.

TECHNICAL FIELD

Embodiments of the present application generally relate to wireless communication technology, especially to methods and apparatuses for a measurement report in a non terrestrial network (NTN) environment.

BACKGROUND

The NTN environment refers to networks or segments of networks, which use a spaceborne vehicle or an airborne vehicle for transmission. For example, a spaceborne vehicle includes a satellite, which may be a Low Earth Orbiting (LEO) satellite, a Medium Earth Orbiting (MEO) satellite, a Geostationary Earth Orbiting (GEO) satellite as well as a Highly Elliptical Orbiting (HEO) satellite. An airborne vehicle includes a High Altitude Platform (HAP) encompassing Unmanned Aircraft Systems (UAS) which includes Lighter than Air UAS (LTA), and a Heavier than Air UAS (HTA).

In 3rd Generation Partnership Project (3GPP), details regarding how to handle a measurement report in a NTN environment have not been discussed.

SUMMARY

Some embodiments of the present application provide a method, which may be performed by a user equipment (UE). The method includes: receiving a radio resource control (RRC) reconfiguration message, wherein the RRC reconfiguration message includes measurement configuration information; performing a measurement procedure based on the measurement configuration information; determining whether one or more reporting events are satisfied, wherein the one or more reporting events trigger to transmit a measurement report; and in response to satisfying a reporting event, transmitting the measurement report.

Some embodiments of the present application also provide an apparatus for wireless communications. The apparatus includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the above-mentioned method performed by a UE.

Some embodiments of the present application provide a method, which may be performed by a base station (BS). The method includes: transmitting a RRC reconfiguration message, wherein the RRC reconfiguration message includes measurement configuration information; receiving a measurement report, wherein the measurement report comprises a result of a measurement procedure performed by a UE; and determining whether to perform a handover procedure based on the result of the measurement procedure.

Some embodiments of the present application also provide an apparatus for wireless communications. The apparatus includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the above-mentioned further method performed by a BS.

The details of one or more examples are set forth in the accompanying drawings and the descriptions below. Other features, objects, and advantages will be apparent from the descriptions and drawings, and from the claims.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G, 3GPP LTE Release 8 and so on. It is contemplated that along with developments of network architectures and new service scenarios, all embodiments in the present application are also applicable to similar technical problems; and moreover, the terminologies recited in the present application may change, which should not affect the principle of the present application.

Figure 1:
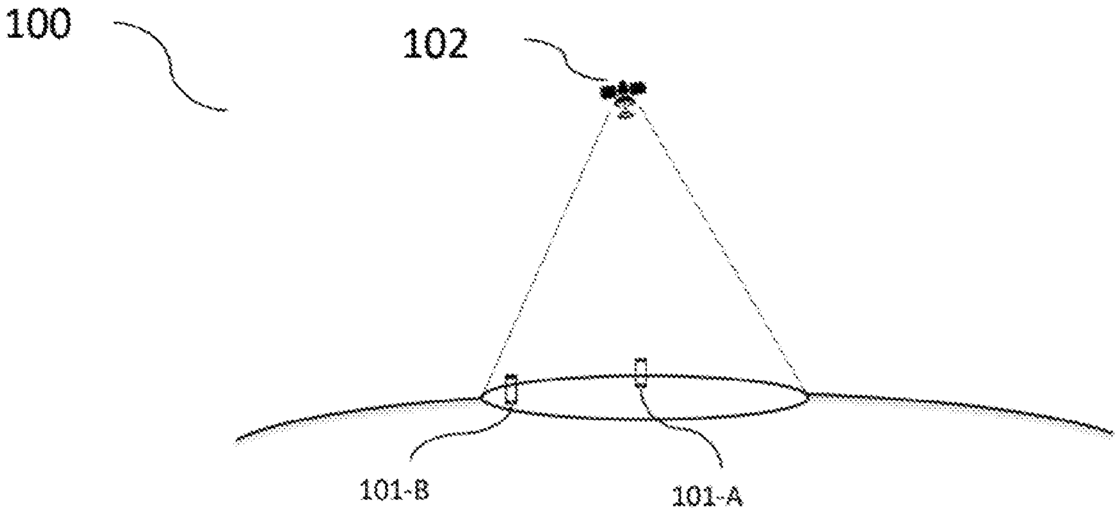
FIG. 1 illustrates a schematic diagram of a wireless communication system in accordance with some embodiments of the present application.

FIG. 1 illustrates a schematic diagram of a wireless communication system in accordance with some embodiments of the present application.

As shown in FIG. 1, the wireless communication system 100 includes two UEs, UE 101-A and UE 101-B, and a BS 102, for example, a satellite BS. Although merely one BS is illustrated in FIG. 1 for simplicity, it is contemplated that the wireless communication system 100 may include more BSs in some other embodiments of the present application. Similarly, although merely two UEs are illustrated in FIG. 1 for simplicity, it is contemplated that the wireless communication system 100 may include more UEs in some other embodiments of the present application. In the coverage of BS 102, UE 101-A is located at the nearest position to BS 102, that is, the distance between the position of UE 101-A and BS 102 is the smallest among all the positions in the coverage of BS 102, and UE 101-B is located at the farthest location to BS 102.

The BS 102 may also be referred to as an access point, an access terminal, a base, a macro cell, a node-B, an enhanced node B (eNB), a gNB, a home node-B, a relay node, or a device, or described using other terminology used in the art. The BS 102 is generally part of a radio access network that may include a controller communicably coupled to the BS 102.

The UE 101-A may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present application, the UE 101-A may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the UE 101-A may include wearable devices, such as smart watches, fitness bands, optical head-mounted displays, or the like. Moreover, the UE 101-A may be referred to as a subscriber unit, a mobile, a mobile station, a user, a terminal, a mobile terminal, a wireless terminal, a fixed terminal, a subscriber station, a user terminal, or a device, or described using other terminology used in the art.

The wireless communication system 100 is compatible with any type of network that is capable of sending and receiving wireless communication signals. For example, the wireless communication system 100 is compatible with a wireless communication network, a cellular telephone network, a time division multiple access (TDMA) based network, a code division multiple access (CDMA) based network, an orthogonal frequency division multiple access (OFDMA) based network, an LTE network, a 3GPP based network, a 3GPP 5G network, a satellite communications network, a high altitude platform network, and/or other communications networks.

Currently, details regarding how to handle a measurement report in a NTN environment have not been discussed. Some embodiments of the present application provide solutions for handling a measurement report in a NTN environment.

Figure 2:
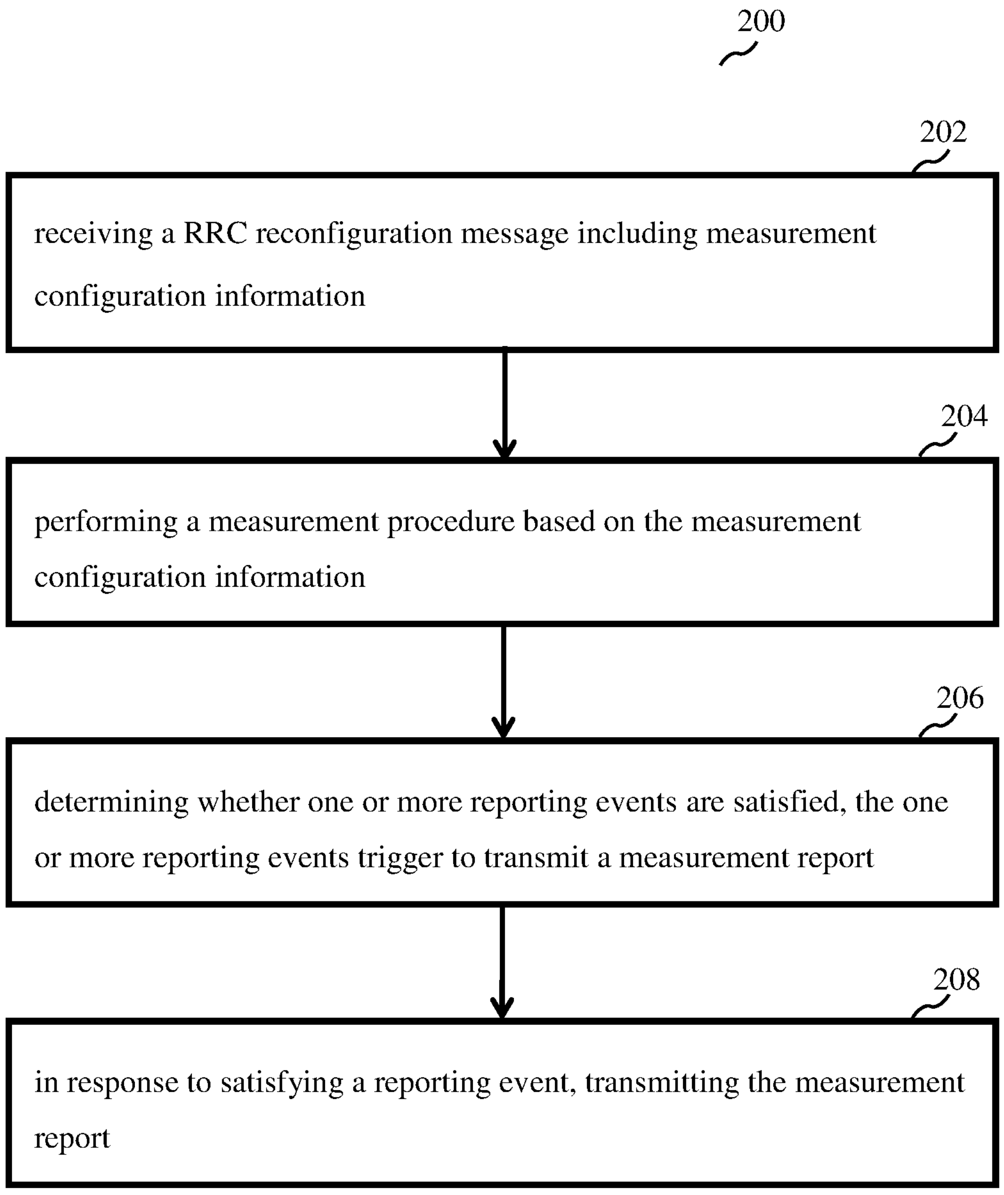
FIG. 2 illustrates an exemplary flowchart of a method for transmitting a measurement report in accordance with some embodiments of the present application.

FIG. 2 illustrates an exemplary flowchart of a method for transmitting a measurement report in accordance with some embodiments of the present application. The embodiments of FIG. 2 may be performed by a UE (e.g., UE 101-A and UE 101-B illustrated and shown in FIG. 1). Although described with respect to a UE, it should be understood that other devices may be configured to perform a method similar to that of FIG. 2.

In the exemplary method 200 as shown in FIG. 2, in operation 202, a UE receives a RRC reconfiguration message. For example, the UE receives a RRC reconfiguration message from a BS (e.g., a BS 102 illustrated and shown in FIG. 1). The RRC reconfiguration message includes measurement configuration information.

In operation 204, the UE performs a measurement procedure based on the received measurement configuration information. The measurement procedure may be used to measure a serving cell and one or more neighbor cells. For example, at least one of the serving cell and the one or more neighbor cells is a NTN cell.

In operation 206, the UE determining whether one or more reporting events are satisfied. The one or more reporting events trigger to transmit a measurement report. For instance, the received measurement configuration information includes reporting configuration information, and the reporting configuration information comprises the one or more reporting events. In operation 208, if a reporting event is satisfied, the UE transmits the measurement report.

According to some embodiments, the reporting event comprises a location based trigger condition. In an example, the location based trigger condition is a location based event that: a distance between a UE and a serving cell is offset greater than a distance between the UE and a neighbor cell. For short, this location based event may be named as Location based event 1.

According to some embodiments, the measurement configuration information received by the UE in operation 202 includes a distance hysteresis parameter and a distance offset.

The distance offset may be associated with "a measurement object of the UE" or "a satellite". The distance offset is cell specific. For example, the distance offset is associated with a source cell of the UE. For intra-frequency and inter-frequency measurements, a measurement object of a UE may indicate the frequency or time location and a subcarrier spacing of reference signals to be measured.

Location based event 1 may include an entering condition (e.g., Entering condition #1 as described below), which may also be named as a distance entering condition or a location entering condition. In an embodiment, the entering condition is: a difference between "a distance between a UE and a serving cell" (e.g., Dp as described below) and "a distance hysteresis parameter" (e.g., Hys1 as described below) is greater than a sum of "a distance between the UE and a neighbor cell" (e.g., Dn as described below) and "a distance offset" (e.g., offset1 as described below).

Location based event 1 may include a leaving condition (e.g., Leaving condition #1 as described below), which may also be named as a distance leaving condition or a location leaving condition. In an embodiment, the leaving condition is: a sum of "a distance between a UE and a serving cell" (e.g., Dp as described below) and "a distance hysteresis parameter" (e.g., Hys1 as described below) is less than a sum of "a distance between the UE and a neighbor cell" (e.g., Dn as described below) and "a distance offset" (e.g., offset1 as described below).

The entering condition and the leaving condition of Location based event 1 in the abovementioned example may be represented by:

Entering condition #1: $Dp-Hys1>Dn+offset1$

Leaving condition #1: $Dp+Hys1<Dn+offset1$ i. Dp (Distance primary) is a distance between a UE and a serving cell (e.g., a master cell group or secondary cell group (SpCell)).
ii. Dn (Distance neighbor) is a distance between a UE and a neighbor cell.
iii. The offset1 is optional. The offset1 may be a parameter associated with "a measurement object of the UE" or "a satellite". The offset1 is cell specific.

iv. Hys1 is a hysteresis parameter for Location based event 1.

In a further example, the location based trigger condition is a further location event that: a distance between a UE and a serving cell is greater than one distance threshold; and/or a distance between the UE and a neighbor cell is less than one further distance threshold. For short, this further location based event may be named as Location based event 2.

According to some embodiments, the measurement configuration information received by the UE in operation 202 includes a distance hysteresis parameter and two distance thresholds. These two distance thresholds may be the same or different in different embodiments.

Location based event 2 may include two entering conditions (e.g., Entering condition #1-1 and Entering condition #1-2 as described below), which may also be named as distance entering conditions or location entering conditions. In an embodiment:

An entering condition is: a difference between "a distance between a UE and a serving cell" (e.g., Dp as described below) and "a distance hysteresis parameter" (e.g., Hys2 as described below) is greater than a distance threshold (e.g., threshold1 as described below).

Another entering condition is: a sum of "a distance between a UE and a neighbor cell" (e.g., Dn as described below) and "a distance hysteresis parameter" (e.g., Hys2 as described below) is less than another distance threshold (e.g., threshold2 as described below).

Location based event 2 may include two leaving conditions (e.g., Leaving condition #1-1 and Leaving condition #1-2 as described below), which may also be named as distance leaving conditions or location leaving conditions. In an embodiment:

A leaving condition is: a sum of "a distance between a UE and a serving cell" (e.g., Dp as described below) and "the distance hysteresis parameter" (e.g., Hys2 as described below) is less than a distance threshold (e.g., threshold1 as described below).

Another leaving condition is: a difference between "a distance between a UE and a neighbor cell" (e.g., Dn as described below) and "the distance hysteresis parameter" (e.g., Hys2 as described below) is greater than another distance threshold (e.g., threshold2 as described below).

The entering conditions and the leaving conditions of Location based event 2 in the abovementioned further example may be represented by:

Entering condition #1-1: $Dp-Hys2>threshold1$

Entering condition #1-2: $Dn+Hys2<threshold2$

Leaving condition #1-1: $Dp+Hys2<threshold1$

Leaving condition #1-2: $Dn-Hys2>threshold2$ i. Hys2 is a hysteresis parameter for Location based event 2.

Regarding a reporting event, the UE may consider a location based event (e.g., Location based event 1 or Location based event 2) whose entering condition is satisfied during one timer to trigger (TTT) (e.g., TTT1) as "fulfilled". The UE may consider a location based event whose leaving condition is satisfied during another TTT (e.g., TTT2) as "not fulfilled". The length of TTT1 may be the same as or different from the length of TTT2. Namely, after an entering condition of a location based event (e.g., Location based event 1 or Location based event 2) is fulfilled during TTT1, the UE considers that the reporting event has been "fulfilled" until a leaving condition of the location based event is fulfilled during TTT2. That is to say, once the leaving condition of the location based event is fulfilled during TTT2, the UE considers that the reporting event is "not fulfilled".

In some embodiments, measurement configuration information includes a TTT. In particular, if duration time of satisfying an entering condition of a location based event (e.g., Location based event 1 or Location based event 2) is equal to or longer than the TTT, the UE may determine that the reporting event is satisfied.

As specified in 3GPP TS 38.331, a measurement based trigger condition includes the following events, e.g., Event A1 to Event A6. In an assumption that a source cell is a SpCell, 3GPP TS 38.331 defines entering conditions and leaving conditions of each of Event A1 to Event A6, respectively.

Event A1 (a serving cell becomes better than a threshold)

Event A2 (a serving cell becomes worse than a threshold)

Event A3 (a neighbor cell becomes offset better than a SpCell)

Event A4 (a neighbor cell becomes better than a threshold)

Event A5 (a SpCell becomes worse than one threshold and neighbor becomes better than another threshold)

Event A6 (a neighbor cell becomes offset better than a secondary cell of a master cell group (S cell))

In some embodiments of the subject application, a reporting event comprises a measurement based trigger condition, e.g., one of Event A1 to Event A6. In an example, the measurement based trigger condition is associated with reference signal received power (RSRP). In another example, the measurement based trigger condition is associated with reference signal received quality (RSRQ).

In some embodiments of the subject application, a reporting event may be a combination of a measurement based trigger condition and a location based trigger condition. For instance, the reporting event may be named as "a combined reporting event" and may be one of:

A combination of Event A1 and Location based event 1.

A combination of Event A1 and Location based event 2.

A combination of Event A2 and Location based event 1.

A combination of Event A2 and Location based event 2.

A combination of "each of Event A3 to Event A6" and "one of Location based event 1 and Location based event 2", similar to the above combinations related to Event A1 and Event A2.

In these embodiments, the measurement configuration information includes a TTT. In particular, if duration time of satisfying an entering condition of Location based event 1 is equal to or longer than the TTT and duration time of satisfying an entering condition of "one of Event A1 to Event A6" is equal to or longer than the TTT, the UE may determine that the combined reporting event is satisfied. If duration time of satisfying an entering condition of Location based event 2 is equal to or longer than the TTT and duration time of satisfying an entering condition of "one of Event A1 to Event A6" is equal to or longer than the TTT, the UE may determine that the combined reporting event is satisfied.

In Option 1, a UE considers an event whose entering condition is satisfied during a TTT as "fulfilled" and considers an event whose leaving condition is satisfied during the TTT as "not fulfilled". That is to say, only when both events in the combined reporting event are fulfilled, the UE transmits a measurement report. If a measurement based event is fulfilled and a location based event is also fulfilled, the UE considers that the measurement report procedure should be triggered.

In some examples of Option 1, the UE may determine that the combined reporting event is not satisfied, in each of the following cases:

- duration time of satisfying a leaving condition of Location based event 1 is equal to or longer than the TTT;
- duration time of satisfying a leaving condition of Location based event 2 is equal to or longer than the TTT; and
- duration time of satisfying a leaving condition of "one of Event A1 to Event A6" is equal to or longer than the TTT.

In some examples of Option 1, if the UE determines that at least one entering condition associated with the report event is not satisfied during the TTT, the UE may determine that the combined reporting event is not satisfied. In other words, if the UE finds that at least one entering condition of the report event has not been satisfied when the TTT expires, the UE determines that the combined report event is not satisfied. For instance, if the UE determines that at least one of "the entering condition of Location based event 1, the entering condition of Location based event 2, and the entering condition of one of Event A1 to Event A6" is not satisfied during the TTT, the UE may determine that the combined reporting event is not satisfied.

In Option 2, a UE considers an event whose entering condition is satisfied during a TTT as "fulfilled" and considers an event whose entering condition is not satisfied during the TTT as "not fulfilled". In some examples of Option 2, the UE may determine that the report event is not satisfied, in each of the following cases:

- duration time of satisfying an entering condition of Location based event 1 is shorter than the TTT;
- duration time of satisfying an entering condition of Location based event 2 is shorter than the TTT; and
- duration time of satisfying an entering condition of "one of Event A1 to Event A6" is shorter than the TTT.

In some embodiments, the UE transmits a capability indicator, e.g., to the BS. The capability indicator may indicate whether the UE supports: Location based event 1, Location based event 2, a measurement based trigger condition (e.g., one of Event A1 to Event A6), a combination of the measurement based trigger condition and Location based event 1; and/or a combination of the measurement based trigger condition and Location based event 2.

In some embodiments, if a leaving condition of the reporting event is satisfied during the TTT, the UE further transmits the measurement report to the serving cell.

In some embodiments, if a distance between the UE and a serving cell is less than a configured distance value, the UE further transmits the measurement report to the serving cell.

In some embodiments, an upper layer of the UE maintains ephemeris of the UE and/or location information of the UE. In an embodiment, the UE receives a location reference point. The location information of the UE is related to the location reference point.

In an embodiment, the upper layer of the UE indicates to a RRC layer of the UE: the ephemeris of the UE; the location information of the UE; a change of the ephemeris of the UE; and/or a change of the location information of the UE. Based on these parameters indicated by the upper layer of the UE, the RRC layer of the UE may check an entering condition and a leaving condition of the reporting event and determines whether the reporting event is satisfied.

In a further embodiment, a RRC layer of the UE transmits, to an upper layer of the UE, the measurement configuration information associated with an entering condition and a leaving condition of the reporting event and a TTT value. Based on these parameters indicated by the RRC layer of the UE, the upper layer of the UE checks the entering condition and the leaving condition of the reporting event and determines whether the reporting event is satisfied and then indicates a determination to the RRC layer of the UE.

The following texts describe two specific embodiments of the method as shown and illustrated in FIG. 2.

Embodiment 1

According to Embodiment 1, a UE (e.g., UE 101-A and UE 101-B illustrated and shown in FIG. 1) and a BS (e.g., a BS 102 illustrated and shown in FIG. 1) perform the following operations:

(1) A UE accesses a network. The network configures this UE with measurement configuration information.

a) The UE is in RRC_CONNECTED state and maintains a measurement object list, a reporting configuration list, and a measurement identities list according to the measurement configuration information.

b) ABS may configure the following one reporting event (i.e., a trigger event of a measurement report) to the UE:

Location based event 1: a SpCell becomes an offset greater than a neighbor cell.

Location based event 2: a distance between the UE and a source cell is greater than one threshold and a distance between the UE and a neighbor cell is less than another threshold.

(2) The UE performs a measurement procedure based on the measurement configuration information. The UE evaluates whether an entering condition of a reporting event (Location based event 1 or Location based event 2) is fulfilled or not. If an entering condition of the reporting event is fulfilled during a TTT, the UE is triggered to report a measurement result.

a) Option 1: an upper layer of the UE maintains ephemeris of the UE and indicates the ephemeris to a RRC layer of the UE. The upper layer of the UE maintains location information of the UE and indicates the location information to the RRC layer. The RRC layer checks an entering condition and a leaving condition of the reporting event. Once the ephemeris and/or the location information is changed, the upper layer of the UE needs to indicate the information to the RRC layer.

b) Option 2: a RRC layer of the UE transmits an entering condition of the reporting event, a leaving condition of the reporting event, and a TTT value to an upper layer of the UE. The upper layer checks the entering condition and the leaving condition of the reporting event and indicates the corresponding result to the RRC layer.

c) If an entering condition of the reporting event is satisfied during a TTT, the UE considers that the reporting event is triggered and begins to report a measurement result.

d) The distance of the serving cell and a neighbor cell will be reported to the serving cell. The distance of the neighbor cell will be reported to the serving cell if the distance between the UE and the neighbor cell is less than one configured distance value.

(3) The BS receives the measurement result from the UE. The BS will decide whether to perform a handover procedure based on the measurement result.

(4) The UE stops reporting the measurement result when the UE considers the reporting event as not fulfilled.

a) The UE considers the reporting event as not fulfilled when a leaving condition of the reporting event is satisfied during a TTT.

b) The UE is triggered to report the measurement result and the location information of the UE when a leaving condition of the reporting event is satisfied during a TTT.

Embodiment 2

According to Embodiment 2, a UE (e.g., UE 101-A and UE 101-B illustrated and shown in FIG. 1) and a BS (e.g., a BS 102 illustrated and shown in FIG. 1) perform the following operations:

(1) After a UE accesses a network, the UE reports a capability indicator to the network and indicates that the UE supports a combined reporting event based measurement report, e.g., a location based event based measurement report+one of legacy event based measurement report.

a) Capability indicator #1: indicating whether the UE supports a location based event to trigger a measurement report.

b) Capability indicator #2: indicating whether the UE supports a combination of a location based event and a measurement based event to trigger a measurement report.

(2) The network configures this UE with measurement configuration information.

a) The UE in RRC_CONNECTED state maintains a measurement object list, a reporting configuration list, and a measurement identities list according to the measurement configuration information.

b) A BS may configure a combined reporting event (i.e., a combined trigger event) to UE, e.g., a combination of one of the following two location based events and one legacy event.

Location based event 1: a SpCell becomes an offset greater than a neighbor cell

Location based event 2: a distance between the UE and a source cell is greater than one threshold and a distance between the UE and a neighbor cell is less than another threshold.

Legacy events as specified in 3GPP TS 38.331:

Event A1 (a serving cell becomes better than a threshold)

Event A2 (a serving cell becomes worse than a threshold)

Event A3 (a neighbor cell becomes offset better than a SpCell)

Event A4 (a neighbor cell becomes better than a threshold)

Event A5 (a SpCell becomes worse than one threshold and neighbor becomes better than another threshold)

Event A6 (a neighbor cell becomes offset better than a secondary cell of a master cell group (S cell))

For example, the BS may configure a combined reporting event as a combination of Location based event 1 and a measurement based trigger condition (e.g., Event A3) or a combination of Location based event 2 and a measurement based trigger condition (e.g., Event A3).

(3) The UE performs a measurement procedure based on the measurement configuration information. The UE evaluates whether an entering condition of the combined reporting event is fulfilled or not. If an entering condition of the combined reporting event is fulfilled during a TTT, the UE is triggered to report measurement result.

a) Option 1: the UE considers satisfying an entering condition of a reporting event during a TTT as fulfilled and considers satisfying a leaving condition of the reporting event during the TTT as not fulfilled. When both events in the combined reporting event are considered as "fulfilled", the UE determines that a measurement report procedure is triggered.

b) Option 2: the UE considers satisfying an entering condition of a reporting event during a TTT as fulfilled and considers not satisfying the entering condition of the reporting event during the TTT as not fulfilled. When both events in the combined reporting event are considered as "fulfilled", the UE determines that a measurement report procedure is triggered.

(4) The BS receives the measurement result from the UE. The BS will decide whether to perform a handover procedure based on the measurement result.

(5) The UE stops reporting the measurement result when the UE considers the reporting event as not fulfilled.

a) Option 1: if one of a measurement based event and a location based event is met, the UE considers the reporting event to be 'not fulfilled'. Then, the UE stops reporting the measurement result.

b) Option 2: only if each of a measurement based event and a location based event is not satisfied, the UE considers the reporting event to be 'not fulfilled'. Then, the UE stops reporting the measurement result.

Figure 3:
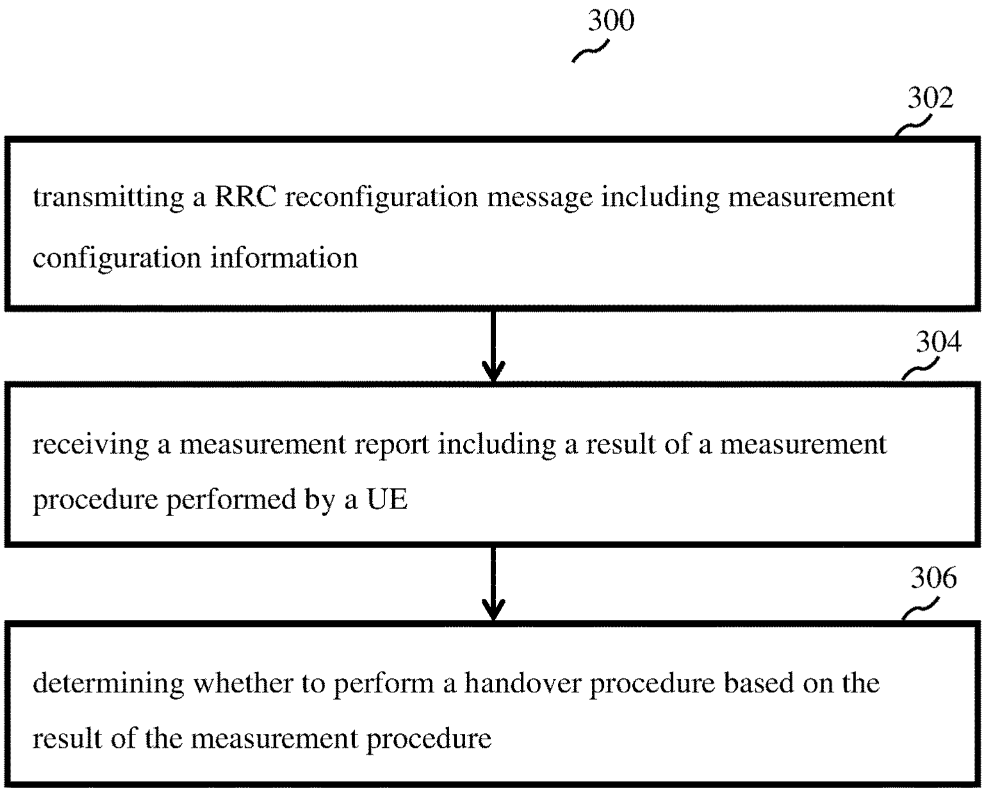
FIG. 3 illustrates an exemplary flow chart of a method for receiving a measurement report in accordance with some embodiments of the present application.
Figure 4:
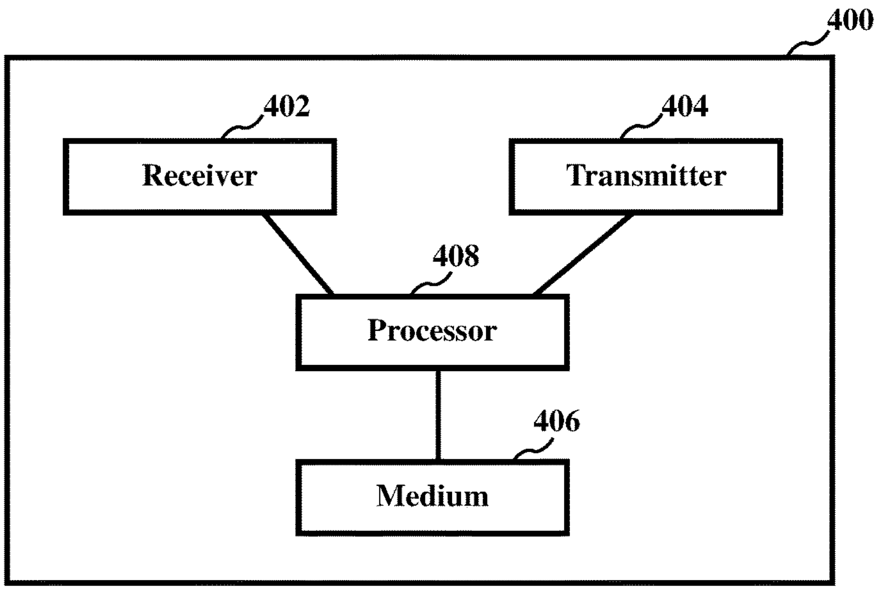
FIG. 4 illustrates an exemplary block diagram of an apparatus according to some embodiments of the present application.

Details described in the embodiments as illustrated and shown in FIGS. 1, 3, and 4, especially, contents related to handling a reporting event, are applicable for the embodiments as illustrated and shown in FIG. 2. Moreover, details described in the embodiments of FIG. 2 are applicable for all the embodiments of FIGS. 1, 3, and 4.

FIG. 3 illustrates an exemplary flow chart of a method for receiving a measurement report in accordance with some embodiments of the present application. The embodiments of FIG. 3 may be performed by a BS or a source BS (e.g., a BS 102 illustrated and shown in FIG. 1). Although described with respect to a BS, it should be understood that other devices may be configured to perform a method similar to that of FIG. 3.

In the exemplary method 300 as shown in FIG. 3, in operation 302, a BS receives a RRC reconfiguration message. The RRC reconfiguration message includes measurement configuration information. For example, the BS receives the RRC reconfiguration message from a UE (e.g., UE 101-A and UE 101-B illustrated and shown in FIG. 1).

In operation 304, the BS receives a measurement report. The measurement report comprises a result of a measurement procedure which is performed by the UE (e.g., UE 101-A and UE 101-B illustrated and shown in FIG. 1). In operation 306, the BS determines whether to perform a handover procedure based on the result of the measurement procedure.

According to some embodiments, the measurement configuration information in the RRC reconfiguration message includes a distance hysteresis parameter and a distance offset. These parameters may be used for Location based event 1. The distance offset is cell specific and may be associated with "a measurement object of the UE" or "a satellite".

According to some embodiments, the measurement configuration information in the RRC reconfiguration message includes a distance hysteresis parameter and two distance thresholds. These parameters may be used for Location based event 2.

In an example, the measurement configuration information in the RRC reconfiguration message includes a timer to trigger (TTT).

According to some embodiments, the BS receives a capability indicator. The capability indicator may indicate whether the UE supports: Location based event 1, Location based event 2, a measurement based trigger condition (e.g., one of Event A1 to Event A6), a combination of the measurement based trigger condition and Location based event 1; and/or a combination of the measurement based trigger condition and Location based event 2. The measurement based trigger condition may be associated with RSRP or RSRQ.

According to some embodiments, the BS transmits a location reference point, e.g., to the UE. The location information of the UE is related to the location reference point.

Details described in the embodiments as illustrated and shown in FIGS. 1, 2, and 4, especially, contents related to measurement configuration information, are applicable for the embodiments as illustrated and shown in FIG. 3. Moreover, details described in the embodiments of FIG. 3 are applicable for all the embodiments of FIGS. 1, 2, and 4.

FIG. 4 illustrates an exemplary block diagram of an apparatus according to some embodiments of the present application. In some embodiments of the present application, the apparatus 400 may be a UE, which can at least perform the method illustrated in FIG. 2. In some embodiments of the present application, the apparatus 400 may be a BS, which can at least perform the method illustrated in FIG. 3.

As shown in FIG. 4, the apparatus 400 may include at least one receiver 402, at least one transmitter 404, at least one non-transitory computer-readable medium 406, and at least one processor 408 coupled to the at least one receiver 402, the at least one transmitter 404, and the at least one non-transitory computer-readable medium 406.

Although in FIG. 4, elements such as the at least one receiver 402, the at least one transmitter 404, the at least one non-transitory computer-readable medium 406, and the at least one processor 408 are described in the singular, the plural is contemplated unless limitation to the singular is explicitly stated. In some embodiments of the present application, the at least one receiver 402 and the at least one transmitter 404 are combined into a single device, such as a transceiver. In certain embodiments of the present application, the apparatus 400 may further include an input device, a memory, and/or other components.

In some embodiments of the present application, the at least one non-transitory computer-readable medium 406 may have stored thereon computer-executable instructions which are programmed to implement the operations of the methods, for example as described in view of FIG. 2 or FIG. 3, with the at least one receiver 402, the at least one transmitter 404, and the at least one processor 408.

Those having ordinary skills in the art would understand that the operations of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the operations of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, those having ordinary skills in the art would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including."

What is claimed:

1. An apparatus for wireless communication, comprising:
at least one memory; and
at least one processor coupled with the at least one memory and configured to cause the apparatus to:
receive a radio resource control (RRC) reconfiguration message,
wherein the RRC reconfiguration message includes measurement configuration information, and
wherein the measurement configuration information includes reporting configuration information that comprises one or more reporting events that trigger transmission of a measurement report;
perform a measurement procedure based on the measurement configuration information;
determine whether the one or more reporting events are satisfied; and
in response to satisfying a reporting event of the one or more reporting events, transmit the measurement report,
wherein the reporting event comprises a location based trigger condition that is satisfied upon both of the following conditions being met:
a first distance between the apparatus and a serving cell is greater than a first distance threshold, and
a second distance between the apparatus and a neighbor cell is less than a second distance threshold.

2. The apparatus of claim 1, wherein the measurement configuration information includes reporting configuration information comprising the one or more reporting events.

3. The apparatus of claim 1, the measurement procedure is used to measure a serving cell and one or more neighbor cells, and at least one of the serving cell and the one or more neighbor cells is a non terrestrial network (NTN) cell.

4. The apparatus of claim 1, wherein the measurement configuration information includes a distance hysteresis parameter, the first distance threshold, and the second distance threshold, wherein the location based trigger condition comprises an entering condition, and wherein the entering condition comprises one of:

a difference between the first distance and the distance hysteresis parameter is greater than the first distance threshold; and a sum of the second distance and the distance hysteresis parameter is less than the second distance threshold.

5. The apparatus of claim 4, wherein the at least one processor is further configured to cause the apparatus to:

determine that a leaving condition of the reporting event is satisfied in response to at least one of:

a sum of the first distance and the distance hysteresis parameter is less than the first distance threshold; and a difference between the second distance and the distance hysteresis parameter is greater than the second distance threshold.

6. The apparatus of claim 1, wherein the measurement configuration information includes a timer to trigger (TTT), and wherein, to determine whether the one or more reporting events are satisfied, the at least one processor is configured to cause the apparatus to:

in response to a duration time of satisfying an entering condition of a reporting event being equal to or longer than the TTT, determine that the reporting event is satisfied.

7. The apparatus of claim 1, where the reporting event further comprises a measurement based trigger condition, and the measurement based trigger condition is at least one of:

a measurement result of a neighbor cell is offset better than a measurement result of a serving cell; and the measurement result of the serving cell is worse than a first threshold and the measurement result of the neighbor candidate cell is better than a second threshold.

8. The apparatus of claim 1, wherein the measurement configuration information includes a timer to trigger (TTT), and wherein the at least one processor is further configured to cause the apparatus to:

in response to a leaving condition of the reporting event being satisfied during the TTT, transmit the measurement report to the serving cell.

9. The apparatus of claim 1, wherein the at least one processor is further configured to cause the apparatus to:

in response to the first distance between the apparatus and the serving cell being less than a configured distance value, transmit the measurement report to the serving cell.

10. The apparatus of claim 1, wherein an upper layer of a user equipment (UE) maintains at least one of:

ephemeris of the UE; and location information of the UE.

11. The apparatus of claim 1, wherein a RRC layer of a user equipment (UE) transmits, to an upper layer of the UE, the measurement configuration information associated with an entering condition and a leaving condition of the reporting event and a TTT value.

12. An apparatus for wireless communication, comprising:

at least one memory; and at least one processor coupled with the at least one memory and configured to cause the apparatus to:

transmit a radio resource control (RRC) reconfiguration message, wherein the RRC reconfiguration message includes measurement configuration information, and wherein the measurement configuration information includes a distance hysteresis parameter, a first distance threshold, and a second distance threshold;

receive a measurement report, wherein the measurement report comprises a result of a measurement procedure performed by a user equipment (UE), wherein the measurement procedure includes a determination that a reporting event is satisfied, wherein the reporting event includes a location based trigger condition having an entering condition, including:

a difference of a first distance between the apparatus, the UE, and the distance hysteresis parameter is greater than a first distance threshold, and wherein the reporting event is satisfied when a leaving condition is satisfied upon the following conditions being met:

a sum of the first distance and the distance hysteresis parameter is less than the first distance threshold, and a difference between the second distance and the distance hysteresis parameter is greater than the second distance threshold; and determine whether to perform a handover procedure based on the result of the measurement procedure.

13. The apparatus of claim 12, wherein the measurement configuration information includes a distance offset.

14. The apparatus of claim 13, wherein the distance offset is associated with at least one of a measurement object of the UE and a satellite.

15. The apparatus of claim 12, wherein the measurement configuration information includes a second distance hysteresis parameter.

16. The apparatus of claim 12, wherein the measurement configuration information includes a timer to trigger (TTT).

17. A method performed by a user equipment (UE), the method comprising:

receiving a radio resource control (RRC) reconfiguration message, wherein the RRC reconfiguration message includes measurement configuration information, and wherein the measurement configuration information includes reporting configuration information that comprises one or more reporting events that trigger transmission of a measurement report;

performing a measurement procedure based on the measurement configuration information;

determining whether the one or more reporting events are satisfied; and in response to satisfying a reporting event of the one or more reporting events, transmitting the measurement report, wherein the reporting event comprises a location based trigger condition that is satisfied upon both of the following conditions being met:

a first distance between the apparatus and a serving cell is greater than a first distance threshold, and a second distance between the apparatus and a neighbor cell is less than a second distance threshold.

* * * * *